United States Patent
Senapati et al.

(10) Patent No.: US 7,603,470 B2
(45) Date of Patent: *Oct. 13, 2009

(54) SYSTEM AND METHOD FOR PROVISIONING BROADBAND SERVICE IN A PPPOE NETWORK USING A CONFIGURATION DOMAIN NAME

(75) Inventors: Ananta Sankar Senapati, Cupertino, CA (US); Manish Sharma, Fremont, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 11/376,815

(22) Filed: Mar. 16, 2006

(65) Prior Publication Data

US 2006/0161643 A1    Jul. 20, 2006

Related U.S. Application Data

(63) Continuation of application No. 09/929,321, filed on Aug. 14, 2001, now Pat. No. 7,047,304.

(51) Int. Cl.
G06F 15/16 (2006.01)
G06F 15/177 (2006.01)
G06F 7/04 (2006.01)

(52) U.S. Cl. .......................... 709/229; 709/220; 726/4; 726/7; 726/21

(58) Field of Classification Search .................. 709/229, 709/220; 370/352, 386; 726/4, 17, 21
See application file for complete search history.

(56) References Cited

U.S. PATENT DOCUMENTS

| | | | |
|---|---|---|---|
| 4,970,721 A | 11/1990 | Aczel et al. | |
| 6,023,464 A | 2/2000 | Woundy | |
| 6,112,305 A | 8/2000 | Dancs et al. | |
| 6,115,755 A | 9/2000 | Krishan | |
| 6,182,136 B1 | 1/2001 | Ramanathan et al. | |
| 6,424,657 B1 | 7/2002 | Voit et al. | |
| 6,542,500 B1 | 4/2003 | Gerszberg et al. | |
| 6,603,758 B1 | 8/2003 | Schmuelling et al. | |
| 6,614,781 B1 | 9/2003 | Elliott et al. | |
| 6,636,505 B1 | 10/2003 | Wang et al. | |
| 6,667,971 B1 | 12/2003 | Modarressi et al. | |
| 6,700,955 B1 | 3/2004 | Davis et al. | |
| 6,711,162 B1 * | 3/2004 | Ortega et al. | 370/389 |
| 6,763,012 B1 | 7/2004 | Lord et al. | |
| 6,798,751 B1 | 9/2004 | Voit et al. | |
| 6,829,234 B1 | 12/2004 | Kaplan et al. | |
| 6,891,825 B1 * | 5/2005 | O'Dell et al. | 370/352 |
| 6,928,463 B1 * | 8/2005 | Tene et al. | 709/203 |
| 7,117,526 B1 * | 10/2006 | Short | 726/5 |

(Continued)

Primary Examiner—Jeffrey Pwu
Assistant Examiner—Guang Li

(57) ABSTRACT

A modem that includes a configuration domain name associated with a configuration Broadband Service Node (BNS) is firstly provided. A PPPoE session is established, and an authentication requested is transmitted, containing the identifier and a generic password, from the modem to a single configuration domain name over the PPPoE network. Authorization is then received from the configuration domain name. The authorization preferably comprises a temporary dynamic Internet Protocol (IP) address. Full configuration details, including a static IP address, are then obtained from an Internet Service Provider (ISP). The invention also provides a system and computer program product for provisioning broadband service in a Point-to-Point Protocol Over Ethernet (PPPoE) network.

19 Claims, 9 Drawing Sheets

U.S. PATENT DOCUMENTS

| | | |
|---|---|---|
| 2001/0019559 A1 | 9/2001 | Handler et al. |
| 2001/0030977 A1* | 10/2001 | May .......................... 370/475 |
| 2001/0049720 A1 | 12/2001 | Eyer |
| 2002/0004935 A1* | 1/2002 | Huotari et al. ............... 717/11 |
| 2002/0080754 A1 | 6/2002 | Travostino et al. |
| 2002/0136226 A1 | 9/2002 | Christoffel et al. |
| 2002/0176404 A1 | 11/2002 | Girard |
| 2003/0028650 A1* | 2/2003 | Chen et al. ................... 709/229 |
| 2003/0200321 A1* | 10/2003 | Chen et al. ................... 709/229 |

* cited by examiner

SYSTEM AND METHOD FOR PROVISIONING BROADBAND SERVICE IN A PPPOE NETWORK USING A CONFIGURATION DOMAIN NAME

CROSS REFERENCE TO RELATED APPLICATIONS

This application is a continuation of U.S. patent application Ser. No. 09/929,321, entitled "SYSTEM AND METHOD FOR PROVISIONING BROADBAND SERVICE IN A PPPOE NETWORK USING A CONFIGURATION DOMAIN NAME," by Ananta Sankar Senapati and Manish Sharma, filed Aug. 14, 2001 now U.S. Pat. No. 7,047,304, which application is hereby incorporated by reference herein.

The present invention relates generally to broadband telecommunications, and particularly to a system and method for provisioning broadband service in a Point-to-Point over Ethernet (PPPoE) network.

BACKGROUND OF THE INVENTION

While high-speed Internet connections to large businesses have been in existence for quite some time, high speed Internet connections to homes and small businesses have only recently become more commonplace. Technologies such as ISDN (Integrated Services Digital Network), Cable modems, Satellite, and DSL (Digital Subscriber Line), are all competing for market share. The two technologies at the forefront, DSL and Cable, offer much faster Internet access than dial-up modems, for a cost substantially lower than ISDN.

Analog modems communicating over regular telephone lines are not fast enough for today's broadband multi-media content. In fact, so-called 56 Kbps modems actually move data at approximately 44 Kbps because of telephone-line imperfections. Furthermore, these modems only reach that speed when receiving data, not sending it.

Typically, analog modems generally connect to the Internet by dialing-up an Internet Service Provider (ISP) over a regular telephone line. This connection is a permanent connection known as a physical circuit. Generally, a Point-to-Point (PPP) data link protocol is used to provision the physical circuit.

DSL, on the other hand, is 250 times faster than a 33.6 Kbps analog modem. DSL, as used herein, refers to different variations of DSL, such as ADSL (Asynchronous Digital Subscriber Line), HDSL(High bit-rate Digital Subscriber Line), and RADSL (Rate Adaptive Digital Subscriber Line).

Most DSL communications that traverse public networks, such as frame relay networks, are established over Permanent Virtual Circuits (PVCs). As the name implies, PVCs are static bidirectional connections that are established ahead of time between two end stations. The PVC is permanently available to the user as if the connection is a dedicated or leased line that is continuously reserved for that user. The PVC connection is established manually when the network is configured and consists of the end stations, the transmission medium, and all of the switches between the end stations. After a PVC has been established, a certain amount of bandwidth is reserved for the PVC, and the two end stations do not need to set up or clear connections. Further details about PVC can be found in Request for Comments (RFC) 2955 and RFC 3070 both of which are hereby incorporated by reference.

However, PVCs generally must be provisioned manually and then kept in place regardless of traffic volume. Therefore, one of the major problems facing the rollout of DSL connections that use PVC connections is the cost and complexity of provisioning DSL service. Typically, provisioning DSL service requires a visit by a technician to the remote location for setup of the telephone line and installation and configuration of the DSL modem and client computer. It has been estimated, that a typical service call to install and configure a DSL modem, currently costs in the region of $300 for the DSL ISP.

More recently, the Incumbent Local Exchange Carriers (ILECs), which are traditional local telephone companies such as one of the Regional Bell companies (RBOCs), for example PACIFIC BELL, have started using Point-to-Point over Ethernet (PPPoE) to run the PPP protocol over Ethernet for DSL connections. One such ILEC is AMERITECH of Chicago, U.S.A. PPPoE supports the protocol layers and authentication widely used in PPP and enables a point-to-point connection to be established in the normally-multipoint architecture of Ethernet.

PPPoE allows ILECs to sublease their lines to other dial-up ISPs, while making it easier for ISPs to provision services to support multiple users across a dedicated DSL connection. Still further, PPPoE also simplifies the end-user experience by allowing a user to dynamically select between ISPs. However, complicates the process of delivering PPP over DSL because it requires users to enter their usernames, passwords, and domains. PPPoE also requires the users to install additional PPPoE client software on their client computers.

The PPPoE functionality, available now in version 2.1 of the REDBACK Subscriber Management System (SMS) 1000 system software, is based on a proposed IETF specification developed jointly by REDBACK NETWORKS, client software developer ROUTERWARE (Newport Beach, Calif.) and WORLDCOM subsidiary UUNET Technologies (Fairfax, Va.). Further details on PPPoE can be found in RFC 2516 which is hereby incorporated by reference.

The typical user experience with a DSL service using PPPoE involves the following steps:

(1) The user deploys a carrier-supplied Bridging DSL modem pre-configured with a PVC;
(2) The user connects the Ethernet port on a Network Interface Card (NIC) in a client computer to the Ethernet interface on the DSL modem;
(3) The user installs the PPPoE driver;
(4) Using standard WINDOWS dial-up networking capabilities, the user sets up a new PPP connection over the Ethernet-connected DSL modem; and
(5) The user clicks on the particular dial-up networking connection, provides the appropriate user name, domain, and password and clicks connect.

The result is the establishment of a PPP session over Ethernet. This PPP session over Ethernet is bridged by the DSL modem to an ATM PVC which connects in an ISP POP (Point of Presence) to a device, such as a REDBACK SMS 1000, capable of terminating an DSL PPP session. At this point, the user has established a connection to the ISP using a model virtually identical to the dial-up analog model, with a notable exception of a faster connection speed and a greater available bandwidth afforded by DSL. Importantly, the entire collection of PPP protocols is unaltered. The Ethernet is simply used as a means to carry PPP messages between a client (client computer) and a remote server. The ISP perceives the connection as a standard PPP session from one of the ISPs subscribers. Also beneficial to the ISP is the fact that if additional user PCs initiate PPP sessions using the same DSL modem and line, no additional PVCs are required. One PVC can support an arbitrary number of PPP sessions, minimizing configuration complexity in the carrier central office.

However, DSL service using PPPoE has a number of disadvantages. First, because the user has to log-in each time a connection is desired, or each time the modem is turned on, a dynamic and not static Internet protocol (IP) address is usually assigned to the client computer and/or DSL modem.

An IP address is the address of a computer attached to a TCP/IP (Transmission Control Protocol/Internet Protocol) network, where every network device (client or server) in a network must have a unique IP address. Client computers either have a static, i.e., permanent, IP address or one that is dynamically assigned to them for each communication session. The dynamic IP addresses is typically automatically assigned to the client computer by a DHCP server. Network devices that serve multiple users, such as servers and printers, require a static IP address that does not change so that data can always be directed to that particular network device. For example, having a static IP address allows a user to set up a Web-server on his/her client computer. Therefore, it is advantageous to have a static IP address and not a dynamic address as typically assigned in a PPPoE network.

A second disadvantage is that each time a PPP connection is made, the user must supply a user name, domain name, and password, such as:

| User name/domain: | user1111@company.com |
| Password: | password1111 |

The need for a domain introduces additional complexity into the system, as the ISP must inform the user in advance which domain name to use.

Therefore, even with the above described advances, DSL users typically still have to at least partly configure their DSL modems themselves by manually entering configuration information into the client computer. In addition, the DSL ISPs also typically spend a substantial amount of resources providing telephone assistance to talk DSL users through the installation and configuration process. Still further, the service provider often still needs to send out technicians to the user to install and configure the DSL system. This process is both costly and time consuming.

A need therefore exists for an easier means for provisioning DSL service using PPPoE that can be undertaken by a user with little, or no, technical skill or know-how.

SUMMARY OF THE INVENTION

Certain existing PPP over Ethernet ("PPPoE) network architectures such as the Ameritech architecture require entry of a domain name in addition to a user name during the authentication phase(<username>@<domainname>). The present invention meets this PPPoE architecture requirement without requiring the user to enter a domain name and/or username. The invention uses software in the modem to automatically (without additional user input), attempt to interactively authenticate the user until authentication is successfully completed.

According to the invention there is provided a computer implemented method for provisioning broadband service in a Point-to-Point Protocol over Ethernet (PPPOE) network. A modem that includes a configuration domain name associated with a configuration Broadband Service Node (BSN) is firstly provided. A PPPoE session is established, and an authentication request is transmitted, containing the identifier and a generic password, from the modem to a single configuration domain name over the PPPoE network. Authorization is then received from the configuration domain name. The authorization preferably comprises a temporary dynamic Internet Protocol (IP) address.

In order to receive full configuration details, the modem firstly obtains a user identifier by requesting only a single identifier from a user of a client computer, and thereafter receiving the identifier. The identifier is then stored in the modem's memory. The modem then transmits a configuration request to an Internet Service Provider (ISP), where the configuration request is addressed from the dynamic IP address. The full configuration details are received from the ISP. The full configuration details are sent from the ISP to the dynamic IP address of the modem. The modem then automatically configures itself based on the full configuration details, which preferably include at least one static IP address.

Further according to the invention there is provided a system for provisioning broadband service in a Point-to-Point Protocol Over Ethernet (PPPoE) network. The system comprises at least one client computer, and a modem coupled to the client computer. The modem includes a memory having instructions for transmitting an authentication request from a modem to a single configuration domain name over a PPPoE network, and instructions for receiving authorization from the configuration domain name. The system also includes a single configuration Broadband Service Node (BSN) coupled to the modem, and an authentication server coupled to the single configuration BSN. The single configuration domain name is associated with the single configuration BSN.

The system also preferably comprises a Digital Subscriber Line Access Multiplexor (DSLAM) coupled between the modem and the single configuration BSN; an Asynchronous Transfer Mode (ATM) network coupled between the DSLAM and the single configuration BSN; and a Broadband Remote Access Server (BRAS) coupled between the ATM network and the single configuration BSN.

Still further according to the invention there is provided a computer program product for use in conjunction with a computer system for provisioning broadband service in a Point-to-Point Protocol Over Ethernet (PPPoE) network. The computer program product comprises a computer readable storage and a computer program stored therein. The computer program comprises instructions for transmitting an authentication request from a modem to a single configuration domain name over a PPPoE network, and instructions for receiving authorization from the configuration domain name.

The present invention ensures optimal operation with existing PPPoE networks which require entry of domain names without placing any additional burden on the user to input the domain name. The authentication is performed by software in the modem and is transparent to the user. Reducing the amount of information that an user has to input manually during authentication reduces the number of problems and errors that can occur during this process, and therefore, is expected to reduce the number calls that customers will make for technical support during this phase of operation.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DESCRIPTION OF THE PREFERRED EMBODIMENTS

Figure 1:
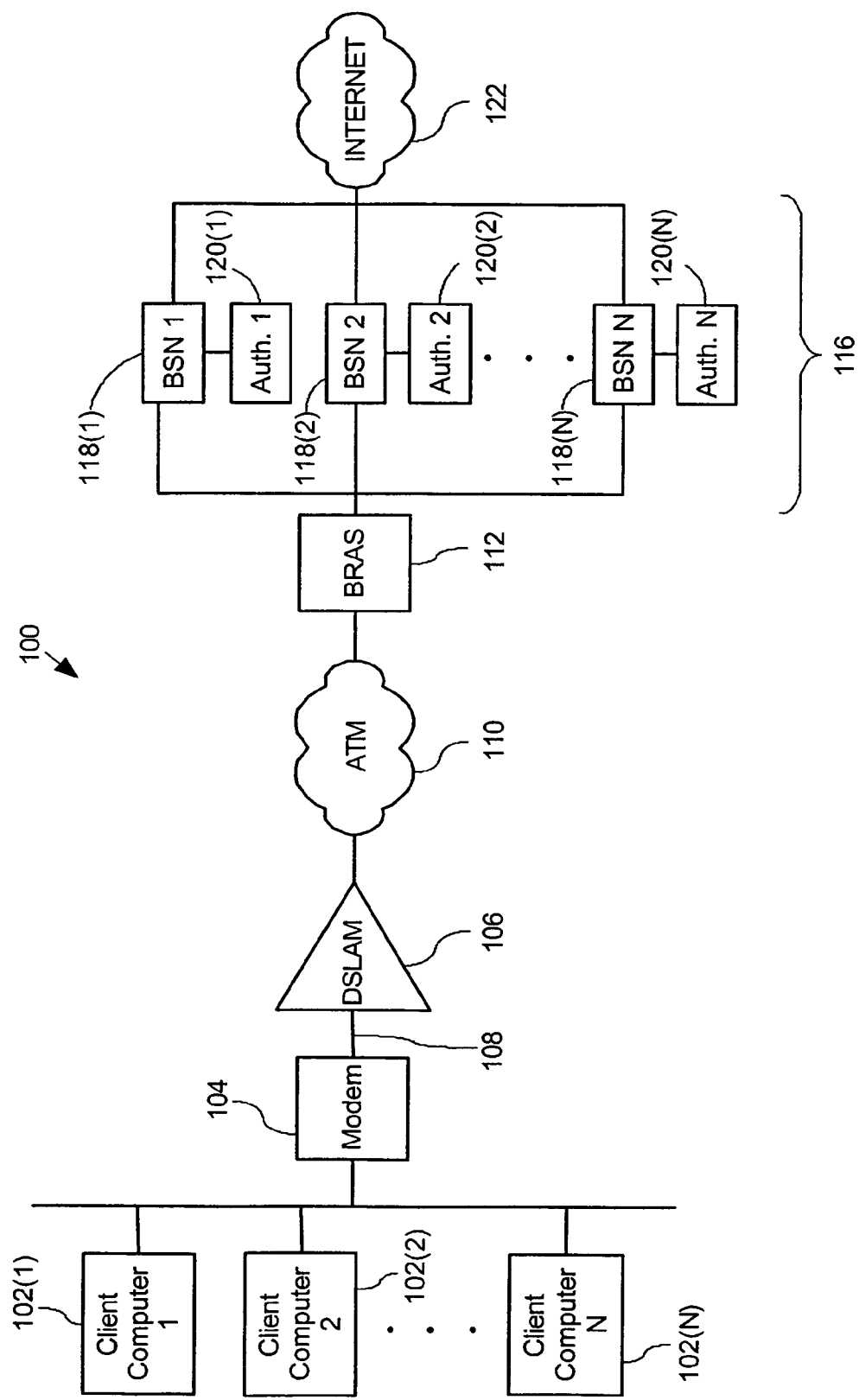
FIG. 1 is a diagrammatic view of the system architecture according to an embodiment of the invention.

FIG. 1 is a diagrammatic view of the system architecture 100 according to an embodiment of the invention. Traditional telephone services, otherwise known as Plain Old telephone Systems (POTS) connect homes or small businesses to a telephone company office over a distance of copper wires or twisted pairs. Traditional telephone services over these twisted pairs allow for the exchange of voice communication with other telephone users using an analog signal. However, in order to provision DSL service over the same twisted pairs, this distance must be less than 18,000 feet (approximately 5.5 Km).

Currently, there are two popular types of DSL systems, namely regular ADSL and splitterless ADSL. Asymmetric DSL (ADSL) is for Internet access, where fast downstream is required, but slow upstream is acceptable. Symmetric DSL (SDSL, HDSL, etc.) is designed for short haul connections that require high speed in both directions. Unlike ISDN, which is also digital but travels through the switched telephone network, DSL provides "always-on" operation. Asymmetric DSL shares the same line as the telephone, because it uses higher frequencies than the voice band. However, a POTS splitter must be installed on the customer's premises to separate the line between voice and data. Splitterless ADSL, known as G.lite, Universal ADSL, ADSL Lite, is geared to the consumer by eliminating the splitter and associated installation charge. All telephones on the telephone line must, however, plug into low-pass filters to isolate them from the higher ADSL frequencies.

A splitter at the telephone company's central office separates voice calls from data. Voice calls are routed by a POTS switch to the a public switched telephone network (PSTN) and thereafter are switched to their destination.

It should be appreciated that although a system and method for provisioning broadband service in a PPPoE network is described in terms of DSL service, the system and method described will work equally as well with any other suitable broadband communication service, such as cable modem, T1 service, or the like.

Each of one or more client computers 102(1)-102(N) are coupled to a modem 104 by any suitable means, such as by Ethernet Category 5 Unshielded Twisted Pair Ethernet cable (CAT 5) through a network hub. Modem 104 is preferably a DSL modem, but alternatively may be any suitable broadband modem. The modem 104 in turn connects to a DSL Access Multiplexor (DSLAM) 106 usually located at a telephone company's central office. The DSLAM is a device for DSL service that intermixes voice traffic and DSL traffic onto a user's DSL line. It also separates incoming phone and data signals and directs them onto the appropriate network. The modem 104 connects to the DSLAM 106 along a regular copper twisted pair telephone line 108.

The DSLAM 106 then connects to a telephone company's, such as an ILECS, Asynchronous Transfer Mode (ATM) network 110. The ATM network is a network technology for both local and wide area networks (LANs and WANs) that supports realtime voice, video, and data. The ATM topology uses switches that establish a logical circuit from end to end, thereby guaranteeing quality of service (QoS). However, unlike telephone switches that dedicate physical circuits end to end, unused bandwidth in ATM's logical circuits can be appropriated when needed. Furthermore, ATM is highly scalable and supports transmission speeds up to 9953 Mbps.

The ATM network 110 in turn connects to a Broadband Remote Access Server (BRAS) 112 that is essentially a switch that connects to numerous Broadband Service Nodes (BSNs) 118(1)-(N) of an ISP 116. Each BSN may be identifier by a unique domain name. The connection from the BRAS to the BSNs is preferably through an additional ATM network (not shown). Each connection from the BRAS 112 through the additional ATM network to each of the BSNs 118 is called a tunnel.

The BSNs 118 allow ISPs to aggregate tens of thousands of subscribers onto one platform and apply customized Internet Protocol (IP) services to these subscribers. Still further, the BSNs enable ISPs to seamlessly migrate from basic broadband subscriber aggregation to more profitable value-added services while providing scalable operations. BSNs are deployed preferably at all Points of Presence (POPs). A suitable BSN is the SHASTA 5000 made by NORTEL NETWORKS.

The BSNs 118 connect to the Internet 122 and to authentication servers 120(1)-(N). In this way, the BSNs can route data signals from the BRAS 112 to the Internet 122, at speeds up to 1 Gbps. Although not shown, each BSN and authentication server also connects to an OSS (Operational Support System) of the DSL ISP. It should be appreciated that the authentication servers 120 may be separate (as shown) or may be a single authentication server. Also, each authentication server includes a lookup table (not shown) that lists user identifiers, such as a username which is preferably comprised of the user's telephone number, against configuration details, such as their DSL IP address and Local Area Network (LAN) IP Subnet.

Suitable authentication servers 120 are RADIUS (Remote Authentication Dial-In User Service) servers running RADIUS software, such as FUNK STEEL BELTED RADIUS made by FUNK SOFTWARE, Inc.

Figure 2:
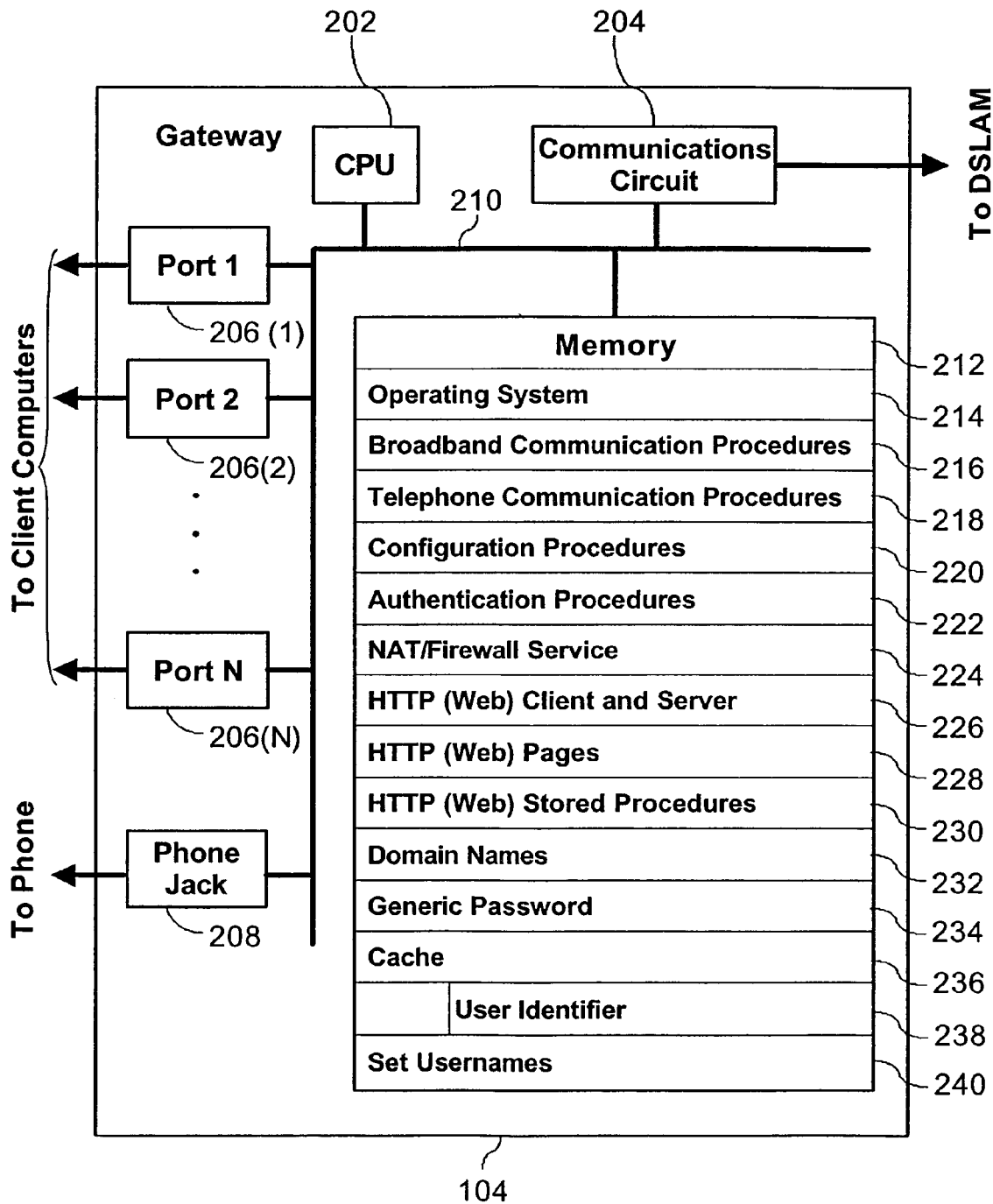
FIG. 2 is a block diagram of the modem shown in FIG. 1.

FIG. 2 is a block diagram of the modem 104 shown in FIG. 1. Modem 104 comprises at least one data processor or central processing unit (CPU) 202, a memory 212, a communications circuit 204, communication ports 206(1)-(N), a telephone jack 208, and at least one bus 210 that interconnects these components. The communications circuit 204 and communication ports 206(1)-(N) may include one or more Network Interface Cards (NICs) configured to use Ethernet.

Memory 212 preferably includes an operating system 214 (such as VXWORKS™, or EMBEDDED LINUX™), having instructions for communicating, processing, accessing, storing, or searching data, etc. Memory 212 also preferably includes broadband communication procedures 216; telephone communication procedures 218; configuration procedures 220; authentication procedures 222; a NAT/Firewall service 224; a HTTP (Web) Client and Server 226; HTTP (Web) Pages 228; HTTP (Web) Stored Procedures 230; a list of BSN 118 (FIG. 1) domain names 232; a generic password 234; a cache 236, including a user identifier 238; and a list of set usernames.

Broadband communication procedures 216 are used for communicating with both the client computers 102 (FIG. 1), DSLAM 106 (FIG. 1), BRAS 112 (FIG. 1), BSNs 118 (FIG. 1) and the Internet 122 (FIG. 1). All communication described below in relation to FIGS. 3, 4A, 4B, 5A, 5B, 6A, and 6B use the broadband communication procedures 216. Telephone communication procedures 218 are used for telephone communications through the phone jack 208. Authentication procedures 222 are used to authenticate a user for DSL service over a PPPoE network as described in relation to FIGS. 4A, 4B, 5A, 5B, 6A, and 6B below. The Network Address Translation (NAT)/Firewall service 224 is used to convert local IP address of each client computer 102 (FIG. 1) into a global IP address and also serve as a firewall by keeping individual IP addresses hidden from the outside world. The HTTP (Web) Client and Server 226 is used to serve and receive the HTTP (Web) Pages 228. The HTTP (Web) Stored Procedures 230 are used to interact with the user. The list of BSN 118 (FIG. 1) domain names 232, user identifier 238, generic password 234, and list of set usernames 240 are used in the authentication of the DSL service as described below. Finally, the cache 236 is used to temporarily store data.

Figure 3:
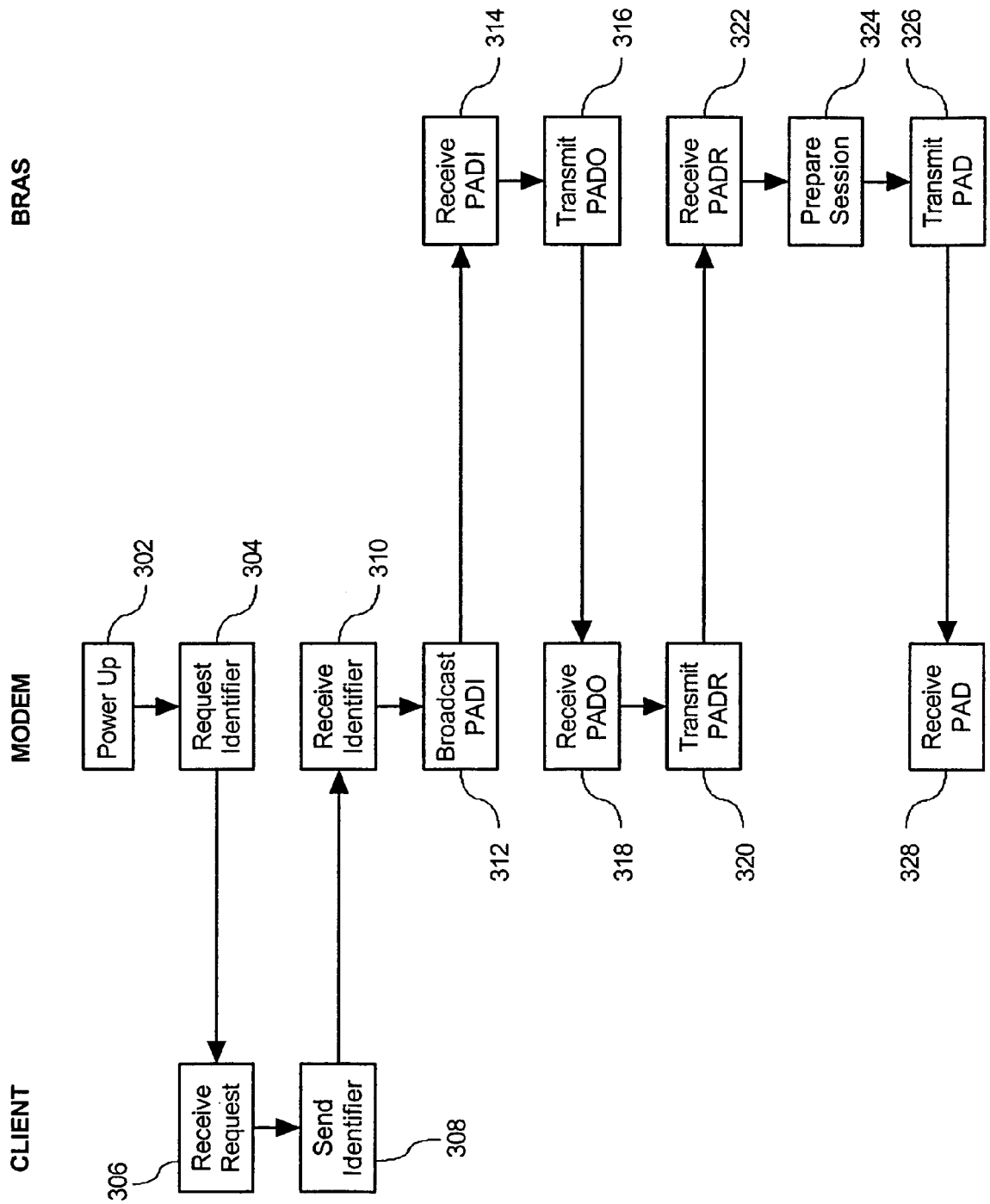
FIG. 3 is a flow chart of a method for establishing a PPPoE session.

FIG. 3 is a flow chart of a method 300 for establishing a PPPoE session. PPPoE has two distinct stages, namely a Discovery stage and a PPP Session stage. When a modem 104 (FIG. 1) wishes to initiate a PPPoE session, it must first perform Discovery to identify the Ethernet MAC address of the BRAS 112 (FIG. 1) and establish a PPPoE SESSION_ID. While PPP defines a peer-to-peer relationship, Discovery is inherently a client-server relationship.

In the Discovery process, the modem 104 (FIG. 1) discovers an BRAS 112 (FIG. 1). When Discovery completes successfully, both the modem 104 (FIG. 1) and the BRAS 112 (FIG. 1) have the information they will use to build their point-to-point connection over Ethernet.

Each Ethernet frame communicated over PPPoE contains the following:

| DESTINATION_ADDR (6 octets) |
| SOURCE_ADDR (6 octets) |
| ETHER_TYPE (2 octets) |
| payload |
| CHECKSUM |

The DESTINATION_ADDR field contains either a unicast Ethernet destination address, or the Ethernet broadcast address (0xffffffff). For Discovery packets, the value is either a unicast or broadcast address as defined in the Discovery section. For PPP session traffic, this field contains the unicast address of the destination device, i.e, the device where the packet is being sent, as determined from the Discovery stage.

The SOURCE_ADDR field contains the Ethernet MAC address of the source device, i.e., the device sending the packet. The ETHER_TYPE is set to either 0x8863 (Discovery Stage) or 0x8864 (PPP Session Stage).

The Ethernet payload for PPPoE is as follows:

| VER | TYPE | CODE | SESSION_ID |
|---|---|---|---|
| LENGTH | | | payload |

The VER field is four bits and contains the version number of the PPPoE specification being used. The TYPE field is four bits and is set to 0x1. The CODE field is eight bits and is defined below for the Discovery and PPP Session stages.

The SESSION_ID field is sixteen bits and its value is fixed for a given PPP session and, in fact, defines a PPP session along with the Ethernet SOURCE_ADDR and DESTINATION_ADDR. The LENGTH field is sixteen bits and indicates the length of the PPPoE payload, while not including the length of the Ethernet or PPPoE headers.

The Discovery stage remains stateless until a PPP session is established. Once a PPP session is established, both the modem 104 (FIG. 1) and the BRAS 112 (FIG. 1) allocate the resources for a PPP virtual interface.

Returning to FIG. 3 once the modem 104 (FIG. 1) has been shipped to the user and the user has connected the communication port/s 206 (FIG. 2) to a client computer 102 (FIG. 1) and connected the communications circuit 204 (FIG. 2) to the DSL ready twisted pair, the modem 104 (FIG. 1) is powered-up 302.

The HTTP (Web) stored procedures 230 and HTTP (Web) Client and Server 226 using the HTTP (Web) Pages 228 then requests 304 a user identifier from the client computer. This user identifier is preferably the user's telephone number. The client computer receives 306 the request and displays the request to the user, preferably via an Internet browser on the client computer. The user then supplies his/her identifier, which is sent 308 by the client computer to the modem, which receives 310 the identifier and stores it in the cache 236 (FIG. 2) as a user identifier 238. It should be appreciated that obtaining and storing the user identifier may occur before (as described here), after, or simultaneously with setting up the PPPoE session.

The modem 104 (FIG. 1) then broadcasts 312 a PPPoE Active Discovery Initiation (PADI) packet with the DESTINATION_ADDR set to the broadcast address. The CODE field is set to 0x09 and the SESSION_ID is set to 0x0000. The PADI packet contains exactly one TAG of TAG_TYPE Service-Name, indicating the service the modem 104 (FIG. 1) is requesting, and any number of other TAG types. An entire PADI packet (including the PPPoE header) does not exceed 1484 octets so as to leave sufficient room for a relay agent to add a Relay-Session-Id TAG.

The BRAS 112 (FIG. 1) receives 314 the PADI and replies by transmitting 316 a PPPoE Active Discovery Offer (PADO) packet. The BRAS transmits 316 the PADO back to the unicast address (DESTINATION_ADDR) of the modem 104 (FIG. 1) that sent the PADI. The CODE field is set to 0x07 and the SESSION_ID is set to 0x0000. The PADO packet contains one BSN-Name TAG containing the BSN's name, a Service-Name TAG identical to the one in the PADI, and any number of other Service-Name TAGs indicating other services that the BRAS 112 (FIG. 1) offers. If the BRAS can not serve the PADI it does not respond with a PADO.

The modem 104 (FIG. 1) receives 318 the PADO and transmits 320 a PPPoE Active Discovery Request (PADR) packet to the BRAS from which it received the PADO. The DESTINATION_ADDR field is set to the unicast Ethernet address of the BRAS 112 (FIG. 1) that sent the PADO. The CODE field is set to 0x19 and the SESSION_ID is set to 0x0000.

The PADR packet contains exactly one TAG of TAG_TYPE Service-Name, indicating the service the modem 104 (FIG. 1) is requesting, and any number of other TAG types.

When the BRAS receives 322 the PADR packet it prepares 324 to begin a PPP session by generating a unique SESSION_ID for the PPPoE session. The BRAS replies 326 to the modem 104 (FIG. 1) with a PPPoE Active Discovery Session-confirmation (PADS) packet. The DESTINATION_ADDR field is the unicast Ethernet address of the modem 104 (FIG. 1) that sent the PADR. The CODE field is set to 0x65 and the SESSION_ID is set to the unique value generated for this PPPoE session. The PADS packet contains exactly one TAG of TAG_TYPE Service-Name, indicating the service under which BRAS 112 (FIG. 1) has accepted the PPPoE session, and any number of other TAG types.

If the BRAS 112 (FIG. 1) does not like the Service-Name in the PADR, then it replies with a PADS containing a TAG of TAG_TYPE Service-Name-Error (and any number of other TAG types). In this case the SESSION_ID is set to 0x0000.

Once the PPPoE session stage begins, PPP data is sent as in any other PPP encapsulation. All Ethernet packets are unicast. The ETHER_TYPE field is set to 0x8864. The PPPoE CODE is set to 0x0000. The SESSION_ID does not change for that PPPoE session and is the value assigned in the Discovery stage. The PPPoE payload contains a PPP frame. The frame begins with the PPP Protocol-ID.

A PPPoE Active Discovery Terminate (PADT) packet may be sent any time after a session is established to indicate that a PPPoE session has been terminated. It may be sent by either the modem 104 (FIG. 1) or the BRAS 112 (FIG. 1). The DESTINATION_ADDR field is a unicast Ethernet address, the CODE field is set to 0xa7 and the SESSION_ID is set to indicate which session is to be terminated. No TAGs are required.

When a PADT is received, no further PPP traffic is allowed to be sent using that session. Even normal PPP termination packets are not sent after sending or receiving a PADT. A PPP peer uses the PPP protocol itself to bring down a PPPoE session, but the PADT may be used when PPP cannot be used. Further details of PPPoE can be found in RFC 2516, which is incorporated herein.

Figure 4A:
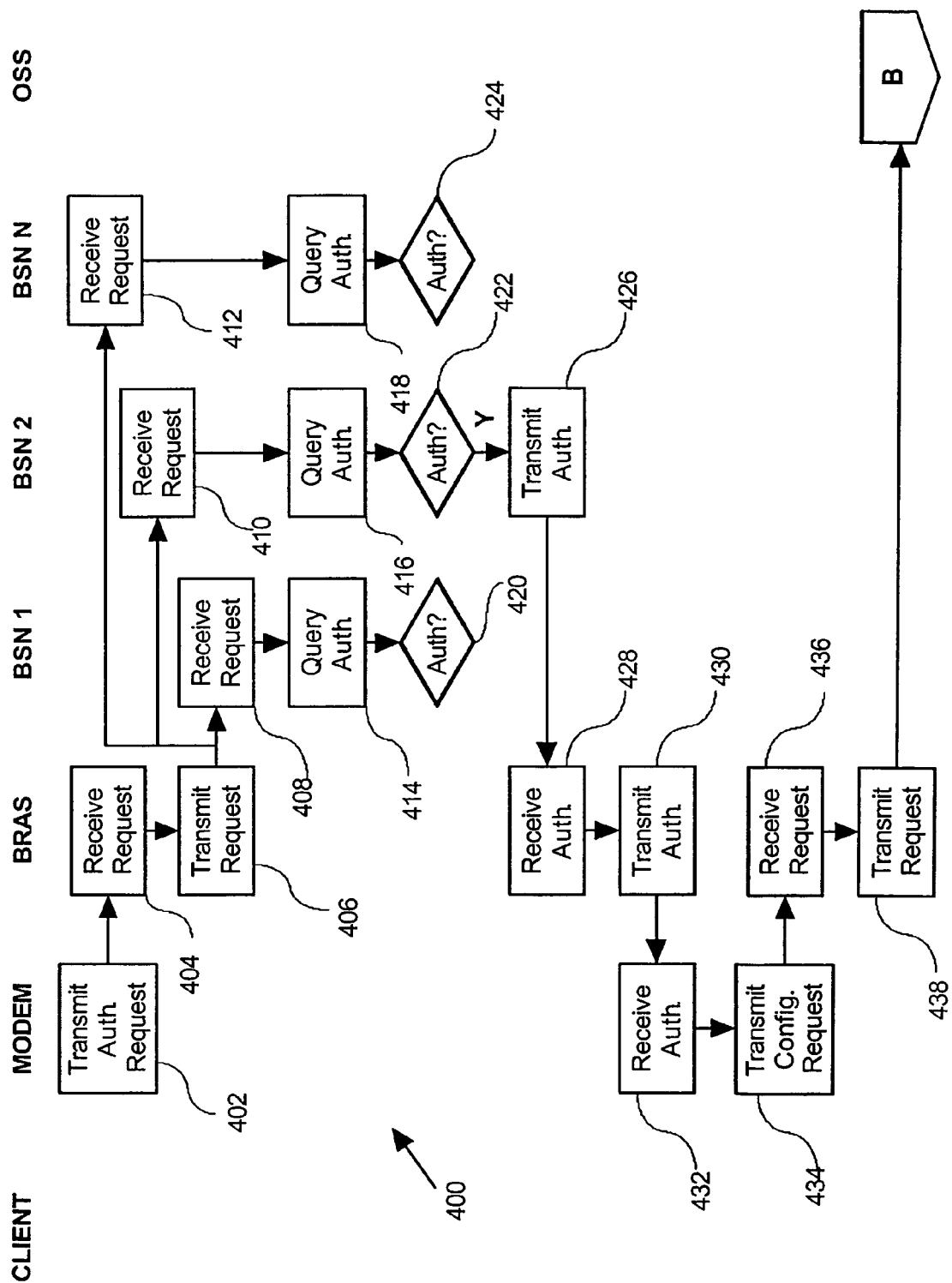
FIGS. 4A and 4B flow charts of a method for provisioning DSL service in a PPPoE network according to an embodiment of the invention.
Figure 4B:
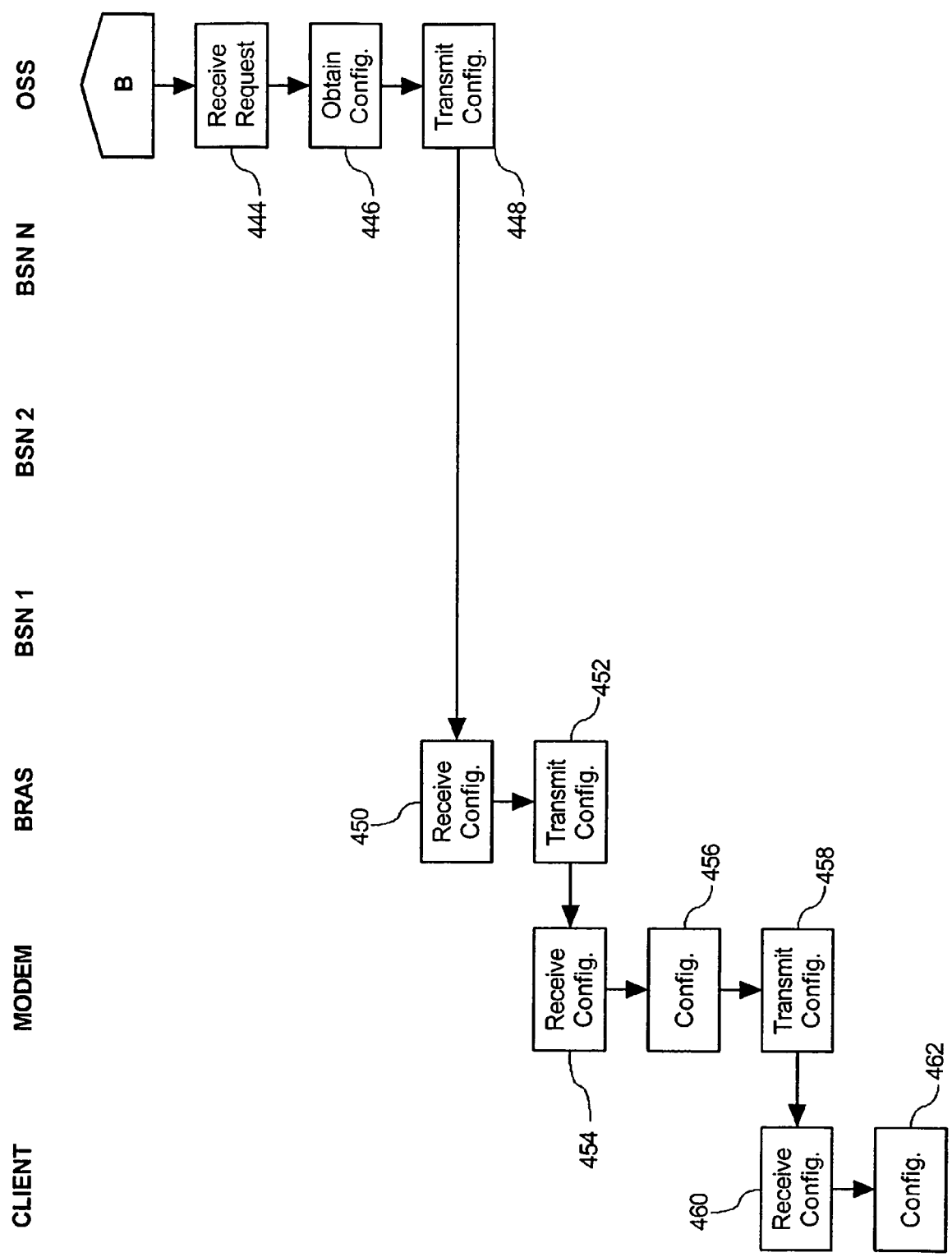

FIGS. 4A and 4B are flow charts of a method 400 for provisioning DSL service in a PPPoE network according to an embodiment of the invention. Once a PPPoE session has been established as described in relation to FIG. 3, the modem 104 (FIG. 1) transmits multiple 402 authentication requests to multiple BSNs 118 (FIG. 1). The DESTINATION_ADDR of the authentication request is set to all the domain names 232 (FIG. 2) that the modem was hardcoded with at the time of manufacture. As PPPoE requires a username and password, in addition to the domain name, the user identifier 238 (FIG. 2) is used as the username, while the generic password 234 (FIG. 2), also hardcoded into the modem at the time of manufacture, is used for the password. An example of the username, password and domain name is: <Username111@BSN1.net>; <Username111@BSN2.net>; . . . ; <Username111@BSNn.net>; and Password111.

The authentication request is sent to all of the BSNs having the hardcoded domain names 232 (FIG. 2) either sequentially or simultaneously. The BRAS 112 (FIG. 1) receives 404 the request and transmits 406 the request to the BSNs, which receive 408, 410, and 412 the request.

Each BSN then queries 414, 416, and 418 its associated authentication server 120 (FIG. 1) to determine whether the authentication server has the user identifier listed in its lookup table. If the identifier supplied by the user is located, 422 (Yes) then that user is authenticated and his/her corresponding configuration details, such as a global IP address, is transmitted 426 to the modem. In a preferred embodiment, the global IP address is a static IP address reserved for the user. In this way, for each PPP session established, a user is always supplied with the same static IP address. If the user's identifier is not located by any of the authentication servers 420 and 424, no further action is taken by those BSNs.

In a preferred embodiment, if none of the BSNs respond, the modem will indicate an error, such as by lighting a red light or displaying an error message in on a Web page to prompt the user to call his/her ISP's technical support.

Once the authentication is received 428 by the BRAS, it is retransmitted 430 to the modem, which receives 432 the authentication details. In a preferred embodiment, the modem then transmits 434 a full configuration request to the OSS. This is only possible once the modem has received a global IP address during the authentication procedure described above. The BRAS receives 436 and retransmits 438 the request for full configuration details to the OSS, which receives 444 the request for configuration details. The OSS obtains the full configuration details based on the identifier and transmits 448 the full configuration details back to the IP address of the modem that made the request. The BRAS receives 450 the configuration details, which are transmitted 452 to the modem. The modem receives 454 the full configuration details and automatically configures 456 itself using the configuration procedures 220 (FIG. 2). Configuration 456 may include rebooting itself. If necessary, the modem transmits 458 the configuration details to the client computer, which receives 460 the configuration details and configures 462 itself accordingly.

In this way, existing PPPoE network architectures such as the AMERITECH architecture that require entry of a domain name in addition to a username during the authentication phase can be provisioned without requiring the user to enter domain names in addition to a single identifier (typically the user's telephone number). In accordance with the present invention, a generic password 234 (FIG. 2) is hardcoded into the modem memory 212 (FIG. 2) for the purpose of authentication.

The user does not have to be informed about the domain name to be used and the user does not have to enter a domain name during the provisioning process. By not requiring the user to enter a domain name in addition to the identifier, the number of customer calls for technical support is reduced.

Figure 5A:
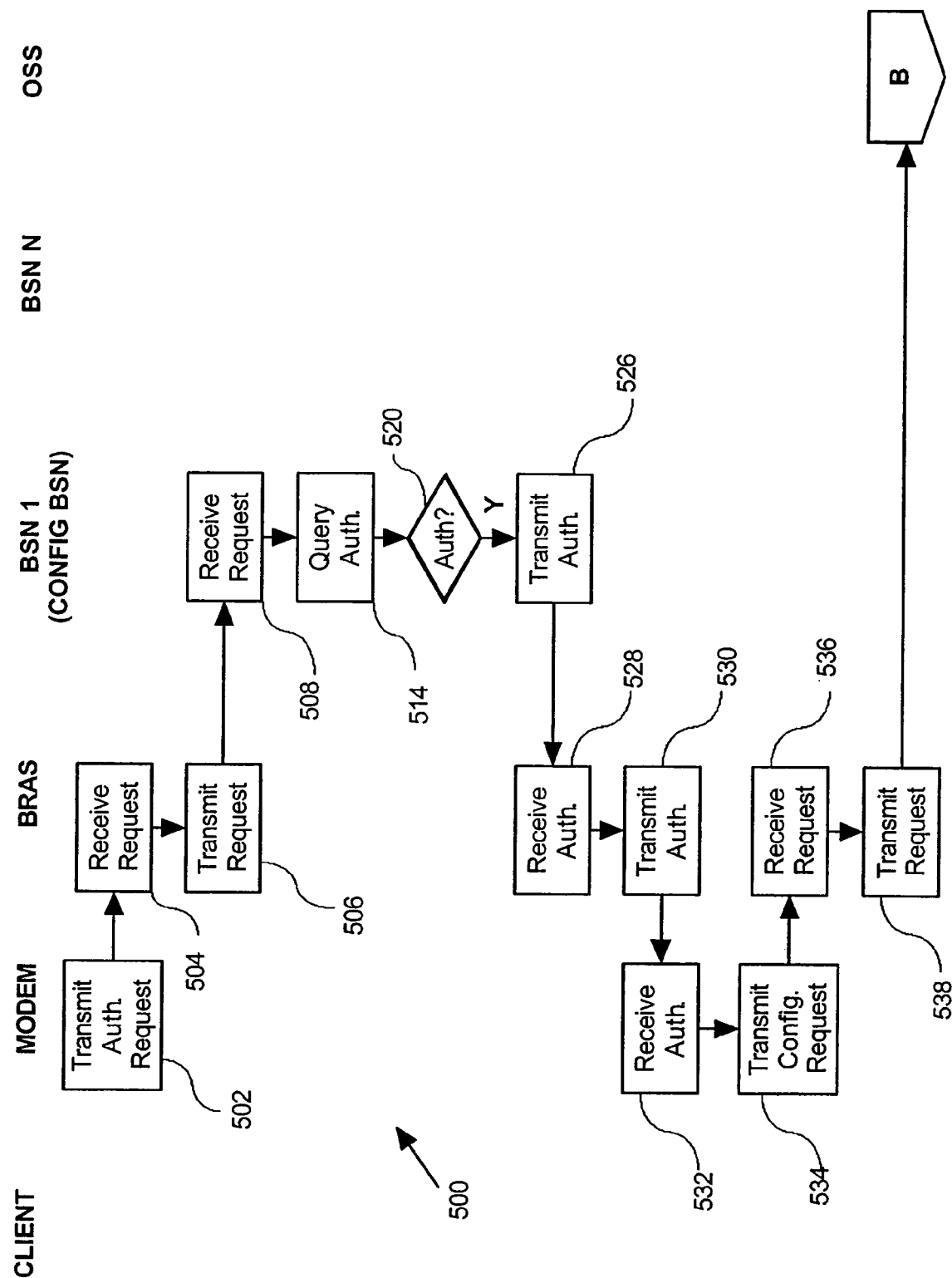
FIGS. 5A and 5B flow charts of a method for provisioning DSL service in a PPPoE network according to another embodiment of the invention.
Figure 5B:
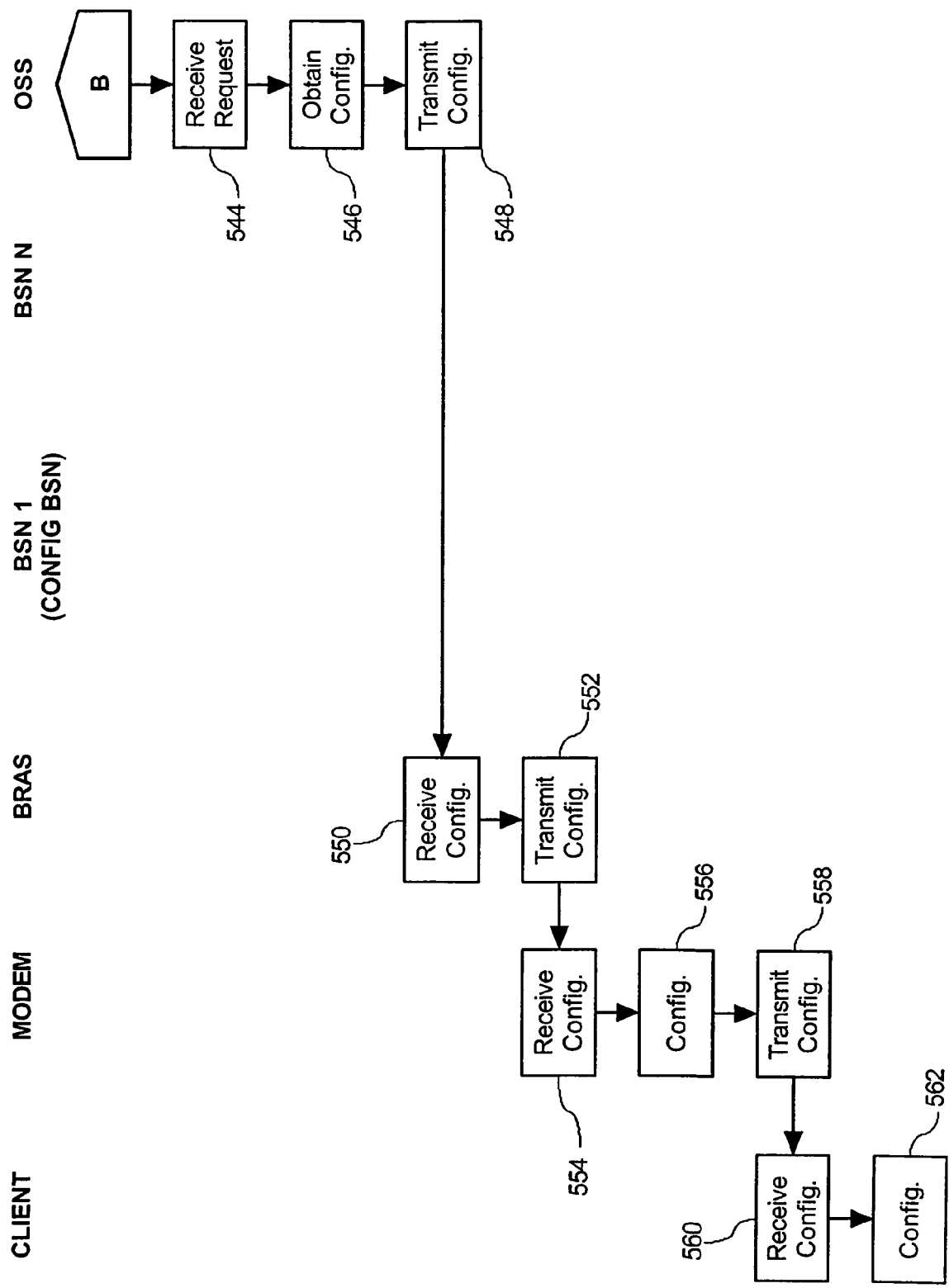

FIGS. 5A and 5B are flow charts of a method 500 for provisioning DSL service in a PPPoE network according to another embodiment of the invention. Once a PPPoE session has been established as described in relation to FIG. 3, the modem 104 (FIG. 1) transmits 502 an authentication request to a single BSN 118 (1) (FIG. 1) only. In this embodiment, one of the domain names 230 (FIG. 2) stored in the modem's memory 212 (FIG. 2) is the domain name of the ISP's configuration BSN, for example "BSN 1" 118 (1). An example of such a domain name is <bsnconfig.net>. The BRAS 112 (FIG. 1) receives 504 the request and transmits 506 the request to the configuration BSN, which receive 508 the request.

The configuration BSN then queries 514 its authentication server 120 (1) (FIG. 1) to determine whether the authentication server has the user identifier 238 (FIG. 2) listed stored in its lookup table. If the identifier supplied by the user is located, 520 (Yes) then that user is authenticated and his/her corresponding configuration details, such as a global IP address, is transmitted 526 to the modem. In this embodiment the global IP address transmitted, is preferably a dynamic IP address, as multiple modems will be requesting authentication from the same configuration BSN. The dynamic IP address is only used for first contact with the OSS, whereafter a static IP address can be assigned to each modem from the OSS. In this way, for each configuration, a user is always supplied with the same static IP address. If the user's identifier is not located by the authentication server 120 (1), then no further action is taken and the modem will indicate an error, such as by lighting a red light on the modem to prompt the user to call his/her ISP's technical support.

Once the authentication is received 528 by the BRAS, it is transmitted 530 to the modem. The modem receives 532 the authentication details. In a preferred embodiment, the modem then transmits 534 a full configuration request to the OSS. This is only possible once the modem has received a global IP address during the authentication procedure described above. The BRAS receives 536 and retransmits 538 the request for full configuration details to the OSS, which receives 544 the request for configuration details. The OSS obtains the full configuration details, including that particular user's static IP address/es, based on the identifier and transmits 548 the full configuration details back to the IP address of the modem that made the request. The BRAS receives 550 the configuration details, which are transmitted 552 to the modem. The modem receives 554 the full configuration details and automatically configures 556 itself using its new permanent static IP address. Configuration 456 may include rebooting itself. If necessary, the modem transmits 558 the configuration details to the client computer, which receives 560 the configuration details and configures 562 itself accordingly.

Therefore, each modem shipped to users provisioned through PPPoE session-based network providers, such as AMERITECH, will have a hardcoded configuration domain name to be used for the first contact. This means that one pre-determined configuration BSN and a domain name associated with it will be used for resolving first contact for every user being supported by such a network. When the user's modem attempts the first contact, the network provider will route the session requests to the pre-determined configuration BSN. The modem will communicate with this pre-determined BSN and get a dynamic IP (temporary, valid for first contact only) for routing and access to the OSS to get the modem's full configuration details. The configuration details include the static (permanent) IP address, the domain name of the BSN on which the user is provisioned along with other configuration information. The static IP address and the domain name is used by the modem for subsequent session establishment. The user only needs to enter a single identifier (phone number). The gateway software will append the domain name (for first contact of for subsequent sessions) to the identifier, e.g., identifier@bsnconfig.net. These full configuration details will be applied as soon as the modem reboots itself after the configuration download.

The domain name will be transparent to the end user (No customer intervention).

Figure 6A:
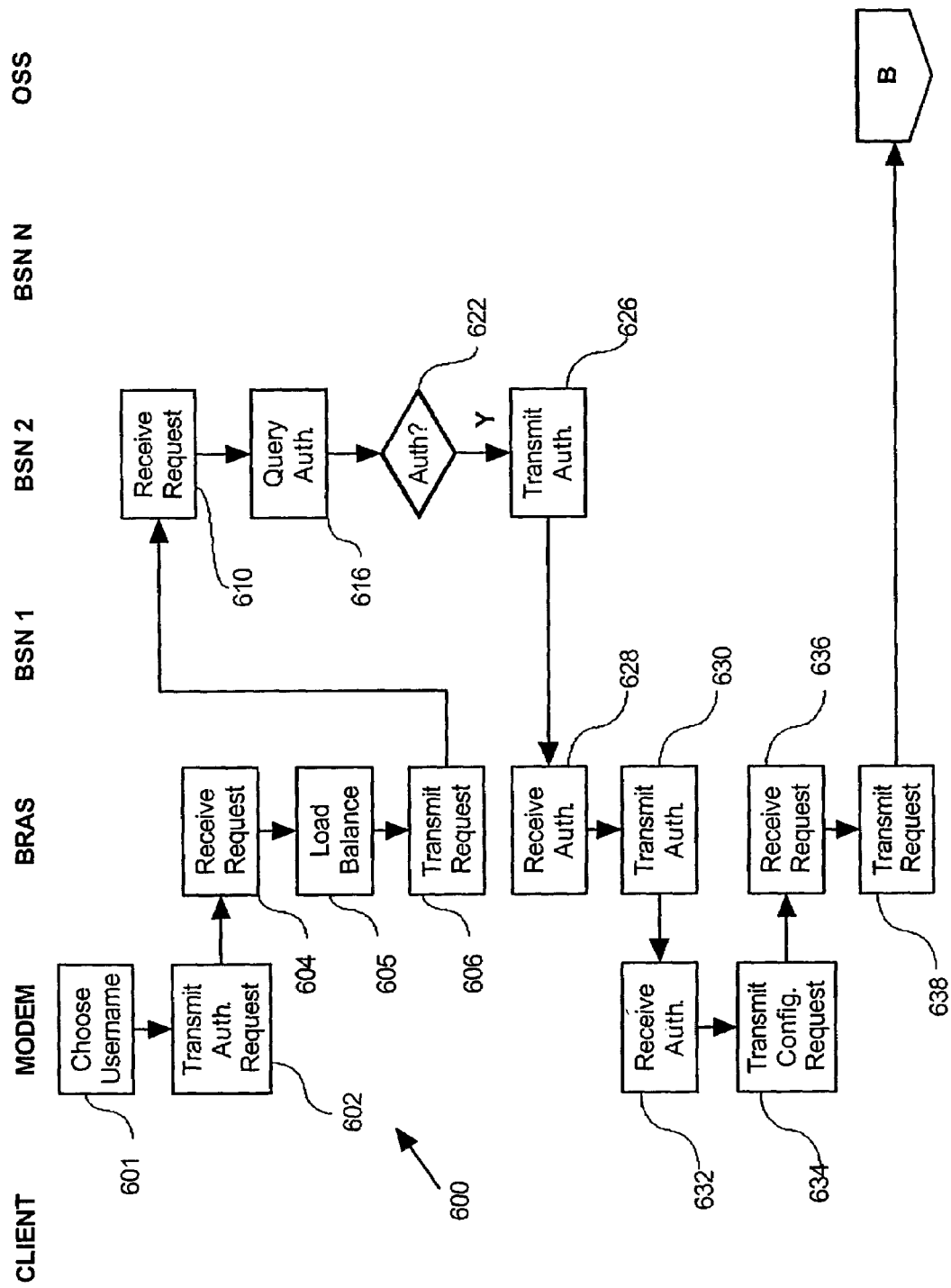
FIGS. 6A and 6B flow charts of a method for provisioning DSL service in a PPPoE network according to yet another embodiment of the invention.
Figure 6B:
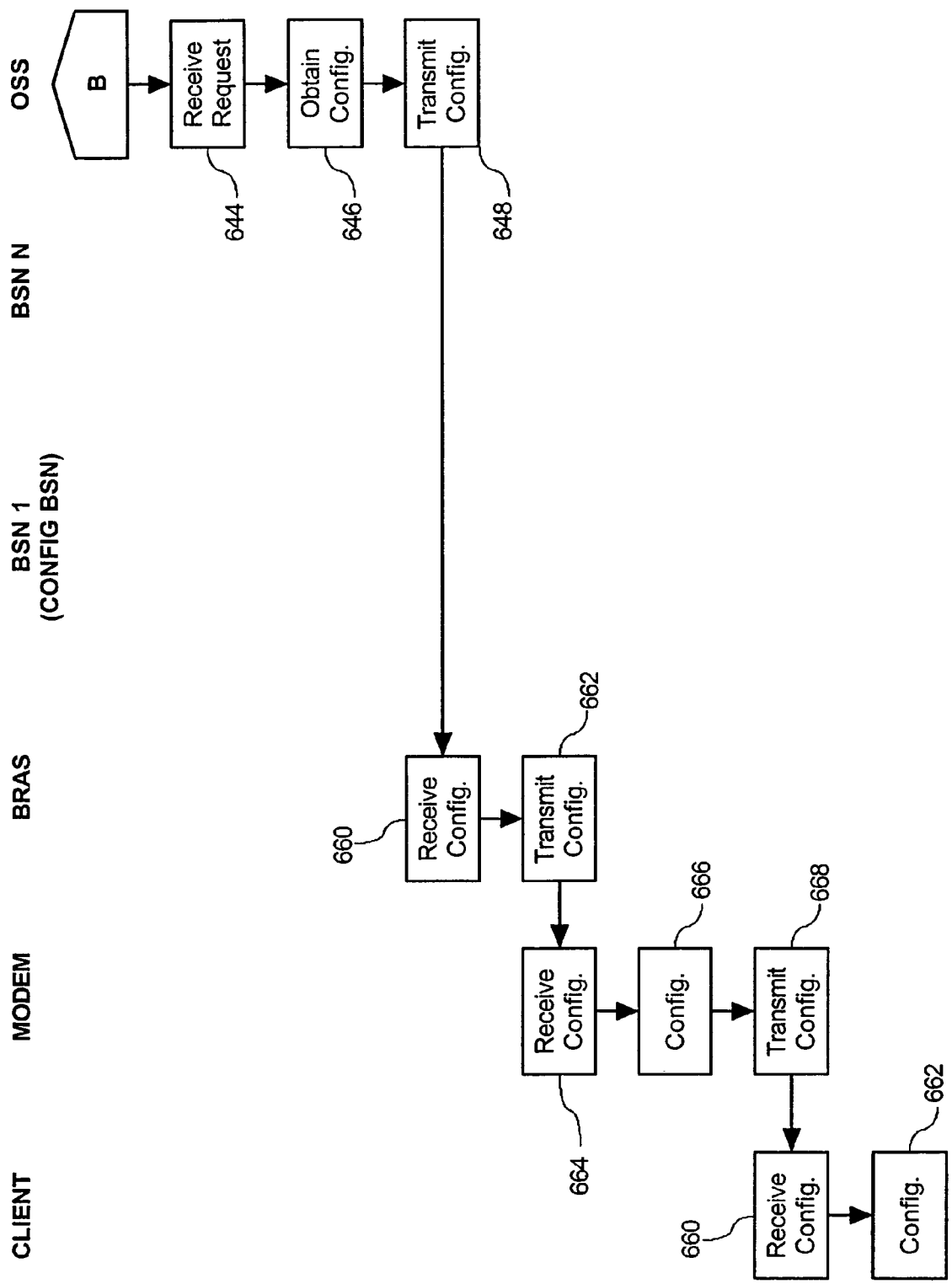

FIGS. 6A and 6B are flow charts of a method 600 for provisioning DSL service in a PPPoE network according to yet another embodiment of the invention. Once a PPPoE session has been established as described in relation to FIG. 3, the modem 104 (FIG. 1) randomly chooses 601 a username from the set usernames 240 (FIG. 2) located in the modem's memory 212 (FIG. 2). The set usernames include a predetermined number of usernames, say twenty five usernames, such as <username 1>; <username 2>, . . . , <username 25>. The DESTINATION_ADDR of the authentication address is set to the BRAS 112 (FIG. 1). Each BSN includes a list of all of the set usernames 240 (FIG. 2), so that any of the BSNs can respond to the authentication request.

The modem 104 (FIG. 1) then transmits 602 an authentication request to the BRAS. The BRAS 112 (FIG. 1) receives 604 the request and load balances 604, i.e, shares out the amount of requests, all requests received between the various BSNs. Once the load balancing occurs and it is determined which BSN the authentication request is to be sent to, the BRAS transmits 606 the request to the BSN, which receives 608 the request.

The BSN then queries 616 its authentication server 120 (1) (FIG. 1) to determine whether the authentication server has the user identifier listed stored in its lookup table. If the identifier supplied by the user is located, 622 (Yes) then that user is authenticated and his/her corresponding configuration details, such as a global IP address, is transmitted 626 to the modem. In this embodiment the global IP address transmitted, is preferably a dynamic IP address, as multiple modems will be requesting authentication from the same BSN. The dynamic IP address is only used for first contact with the OSS, whereafter a static IP address can be assigned to each modem from the OSS. In this way, for each configuration, a user is always supplied with the same static IP address. If the user's identifier is not located by the authentication server 120 (1), then no further action is taken and the modem will indicate an error, such as by lighting a red light on the modem to prompt the user to call his/her ISP's technical support.

Once the authentication is received 628 by the BRAS, it is transmitted 630 to the modem. The modem receives 632 the authentication details. In a preferred embodiment, the modem then transmits 634 a full configuration request to the OSS. This is only possible once the modem has received a global IP address during the authentication procedure described above. The BRAS receives 636 and retransmits 638 the request for full configuration details to the OSS, which receives 644 the request for configuration details. The OSS obtains the full configuration details, including that particular user's static IP address/es, based on the identifier and transmits 648 the full configuration details back to the IP address of the modem that made the request. The BRAS receives 660 the configuration details, which are transmitted 662 to the modem. The modem receives 664 the full configuration details and automatically configures 666 itself. If necessary, the modem transmits 668 the configuration details to the client computer, which receives 660 the configuration details and configures 662 itself accordingly.

Therefore, a two-phase authentication process is used. A fixed number of generic usernames are established for use during configuration downloads on all of the BSNs. During the first phase of authentication, one of these usernames 240 (FIG. 2) is randomly selected and used to assign a dynamic (i.e. temporary) IP address. This is used in the second phase to connect to the OSS which then sends the permanent (i.e. static) IP address and domain name to the user. The two step process is automatically performed by the authentication procedures 222 (FIG. 2) in the modem and is transparent to the user.

The user does not have to be informed about the domain name to be used and the user does not have to enter a domain name during the provisioning process.

If the authentication is not successful because to many authentications are occurring on a BSN because of load balancing problems, username conflicts, depletion of IP pool, etc., then, the modem preferably waits a randomly chosen time between 5 to 20 seconds and retries with another randomly chosen username.

In addition, for any of the methods described above in relation to FIGS. 3-6, if any of the BSNs 118 fail to operate, the OSS can remotely reconfigure other BSNs to have the domain name of the failed BSN and thereby accept incoming requests meant for the failed BSN. In a similar manner the authentication servers 120 can also be remotely managed to add, delete, or amend their lookup tables.

While the foregoing description and drawings represent the preferred embodiment of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A computer implemented method for provisioning broadband service in a Point-to-Point Protocol over Ethernet (PPPoE) network, comprising:
    transmitting an authentication request from a modem to a single configuration domain name over a PPPoE network; and
    receiving authorization from said configuration domain name, comprising
        acquiring at least one temporary dynamic Internet Protocol (IP) address;
        transmitting a configuration request to an Internet Service Provider (ISP), where said configuration request is addressed from said temporary dynamic IP address;
        receiving configuration information from said ISP, where the configuration information includes a static IP address, and where said configuration information is addressed to said temporary dynamic IP address; and
        automatically configuring said modem based on said configuration information.

2. The method of claim 1, further comprising, prior to said transmitting step, the step of providing a modem that includes a configuration domain name associated with a configuration Broadband Service Node (BSN).

3. The method of claim 1, further comprising, prior to said transmitting step, the step of establishing a PPPoE session.

4. The method of claim 1, further comprising, prior to said transmitting step, the steps of:
    requesting only a single identifier from a user of a client computer;
    receiving said identifier; and
    storing said identifier.

5. The method of claim 4, wherein said transmitting step comprises transmitting an authorization request containing said identifier and a generic password to said single configuration domain name.

6. An apparatus for provisioning broadband service in a Point-to-Point Protocol over Ethernet (PPPoE) network, comprising:
    means for transmitting an authentication request from a modem to a single configuration domain name over a PPPoE network; and
    means for receiving authorization from said configuration domain name, comprising acquiring at least one temporary dynamic Internet Protocol (IP) address, comprising;
        means for transmitting a configuration request to an Internet Service Provider (ISP), where said configuration request is addressed from said temporary dynamic IP address;
        means for receiving configuration information from said ISP, where the configuration information includes a static IP address, and where said configuration information is addressed to said temporary dynamic IP address; and
        means for automatically configuring said modem based on said configuration information.

7. The apparatus of claim 6, wherein a modem that includes a configuration name associated with a configuration Broadband Service Node (BSN) is provided prior to transmitting the authentication request.

8. The apparatus of claim 6, further comprising means for establishing a PPPoE session prior to transmitting the authentication request.

9. The apparatus of claim 6, further comprising:
    means for requesting only a single identifier from a user of a client computer, receiving said identifier, and storing said identifier prior transmitting the authentication request.

10. The apparatus of claim 9, wherein said means for transmitting comprises means for transmitting an authorization request containing said identifier and a generic password to said single configuration domain name.

11. An apparatus for provisioning broadband service in a Point-to-Point Protocol over Ethernet (PPPoE) network, comprising:
    a transmitter configured to transmit an authentication request to a single configuration domain name over a PPPoE network; and
    a receiver, configured to receive authorization from said configuration domain name, comprising acquiring at least one temporary dynamic Internet Protocol (IP) address;
    wherein the transmitter is further configured to transmit a configuration request to an Internet Service Provider (ISP), where said configuration request is addressed from said temporary dynamic IP address;
    wherein the receiver is further configured to receive configuration information from said ISP, where the configuration information includes a static IP address, and where said configuration information is addressed to said temporary dynamic IP address; and
    wherein the modem is automatically configured based on said configuration information.

12. The apparatus of claim 11, wherein the apparatus comprises a modem including a configuration name associated with a configuration Broadband Service Node (BSN) and wherein the modem is provided prior to transmitting the authentication request.

13. The apparatus of claim 11, further comprising means for establishing a PPPoE session prior to transmitting the authentication request.

14. The apparatus of claim 11, further comprising:
    means for requesting only a single identifier from a user of a client computer, receiving said identifier, and storing said identifier prior transmitting the authentication request.

15. The apparatus of claim 14, wherein the transmitter comprises means for transmitting an authorization request containing said identifier and a generic password to said single configuration domain name.

16. A computer program product for use in conjunction with a computer system for provisioning broadband service in a Point-to-Point Protocol Over Ethernet (PPPoE) network, the computer program product comprising a computer readable storage and a computer program stored therein, the computer program comprising:

instructions for transmitting an authentication request from a modem to a single configuration domain name over a PPPoE network; and instructions for receiving authorization from said configuration domain name comprising instructions for acquiring at least one temporary dynamic Internet Protocol (IP) address;

transmitting a configuration request to an Internet Service Provider (ISP), where said configuration request is addressed from said temporary dynamic IP address;

receiving configuration information from said ISP, where said configuration information includes a static IP address, and where said configuration information is addressed to said temporary dynamic IP address; and automatically configuring said modem based on said configuration information.

17. The computer program product of claim 16, wherein the computer program further comprises instructions for establishing a PPPoE session prior to said transmitting the authentication request.

18. The computer program product of claim 16, wherein the computer program further comprises instructions for requesting only a single identifier from a user of a client computer, for receiving said identifier, and for storing said identifier prior to transmitting the authentication request.

19. The computer program product of claim 18, wherein said instructions for transmitting the authentication request comprises transmitting an authorization request containing said identifier and a generic password to said single configuration domain name.

* * * * *